United States Patent
Melton

(10) Patent No.: US 9,945,474 B2
(45) Date of Patent: Apr. 17, 2018

(54) SHIFT CONTROL FOR AN AUTOMATIC TRANSMISSION

(71) Applicant: Deere & Company, Moline, IL (US)

(72) Inventor: Peter Melton, Gypsum, KS (US)

( * ) Notice: Subject to any disclaimer, the term of this patent is extended or adjusted under 35 U.S.C. 154(b) by 269 days.

(21) Appl. No.: 14/868,521

(22) Filed: Sep. 29, 2015

(65) Prior Publication Data

US 2017/0089455 A1   Mar. 30, 2017

(51) Int. Cl.
| | |
|---|---|
| F16H 61/02 | (2006.01) |
| F16H 59/36 | (2006.01) |
| F16H 59/42 | (2006.01) |
| F16H 59/44 | (2006.01) |
| F16H 59/14 | (2006.01) |
| F16H 59/40 | (2006.01) |
| F16H 59/48 | (2006.01) |

(52) U.S. Cl.
CPC ......... *F16H 61/0213* (2013.01); *F16H 59/36* (2013.01); *F16H 59/42* (2013.01); *F16H 59/44* (2013.01); *F16H 59/14* (2013.01); *F16H 59/40* (2013.01); *F16H 59/48* (2013.01); *F16H 2059/147* (2013.01); *F16H 2059/363* (2013.01); *F16H 2059/366* (2013.01)

(58) Field of Classification Search
CPC .......... F16H 59/36; F16H 59/40; F16H 59/42; F16H 59/44; F16H 61/0213
See application file for complete search history.

(56) References Cited

U.S. PATENT DOCUMENTS

| | | | |
|---|---|---|---|
| 5,771,171 A | 6/1998 | Tazawa | |
| 5,902,213 A * | 5/1999 | Tsutsui | F16H 61/061 475/126 |
| 6,173,226 B1 * | 1/2001 | Yoshida | B60W 10/06 477/105 |
| 2002/0095248 A1 * | 7/2002 | Katakura | F02D 41/0225 701/34.4 |

FOREIGN PATENT DOCUMENTS

| | | |
|---|---|---|
| JP | H02221758 | 9/1990 |
| JP | 8338517 | 12/1996 |

* cited by examiner

*Primary Examiner* — Edwin A Young
(74) *Attorney, Agent, or Firm* — Michael Best & Friedrich LLP

(57) ABSTRACT

A system for controlling shifting includes an engine, a driven member, and a shiftable transmission including an input shaft coupled to the engine and an output shaft coupled to the driven member. The system further includes a plurality of sensors for monitoring parameters of at least one of the engine, the driven member, or the transmission, a torque converter disposed between the engine and the input shaft, and an electronic control unit including a processor and a memory. The electronic control unit is operable to receive sensed parameters from the plurality of sensors, determine a torque ratio across the torque converter based on the sensed parameters, determine a speed ratio associated with the torque ratio, determine a rotational speed of the input shaft based on the speed ratio and the sensed parameters, and make a shifting decision based on the rotational speed of the input shaft.

20 Claims, 6 Drawing Sheets

SHIFT CONTROL FOR AN AUTOMATIC TRANSMISSION

BACKGROUND

The present disclosure relates to automatic transmissions and more particularly to systems and methods for controlling shifting of automatic transmissions.

SUMMARY

A typical shift control system for an automatic transmission includes a hardware speed sensor for determining a rotational speed of a transmission input shaft. The speed sensor provides feedback to a control unit, which uses the feedback to properly time shifts. It may be desirable to remove the speed sensor to reduce cost, complexity, or size of the shift control system, for example. However, knowledge of the rotational speed of the transmission input shaft is still required to produce quality shifts. Therefore, a need exists for a shift control system that is able to determine the rotational speed of the transmission input shaft without a dedicated speed sensor.

In one embodiment, a system for controlling shifting includes an engine, a driven member, and a transmission including an input shaft coupled to the engine and an output shaft coupled to the driven member. The transmission is shiftable to vary a gear ratio from the input shaft to the output shaft. The system further includes a plurality of sensors for monitoring parameters of at least one of the engine, the driven member, or the transmission, a torque converter disposed between the engine and the input shaft, and an electronic control unit including a processor and a memory. The electronic control unit is operable to receive sensed parameters from the plurality of sensors, determine a torque ratio across the torque converter based on the sensed parameters, determine a speed ratio associated with the torque ratio, and determine a rotational speed of the input shaft based on the speed ratio and the sensed parameters. The electronic control unit is further operable to make a shifting decision based on the rotational speed of the input shaft.

In another embodiment, a method of controlling shifting for a drivetrain having an engine, a driven member, a shiftable transmission including an input shaft coupled to the engine and an output shaft coupled to the driven member, and a torque converter disposed between the engine and the input shaft, includes monitoring parameters of at least one of the engine, the driven member, or the transmission using a plurality of sensors, determining a torque ratio across the torque converter based on the monitored parameters, determining a speed ratio associated with the torque ratio, determining a rotational speed of the input shaft based on the speed ratio and the monitored parameters, and making a shifting decision based on the rotational speed of the input shaft.

Other features and aspects of the disclosure will become apparent by consideration of the following detailed description and accompanying drawings.

Before any embodiments of the disclosure are explained in detail, it is to be understood that the disclosure is not limited in its application to the details of construction and the arrangement of components set forth in the following description or illustrated in the following drawings. The disclosure is capable of supporting other embodiments and of being practiced or of being carried out in various ways. Also, it is to be understood that the phraseology and terminology used herein is for the purpose of description and should not be regarded as limiting.

DETAILED DESCRIPTION

Figure 1:
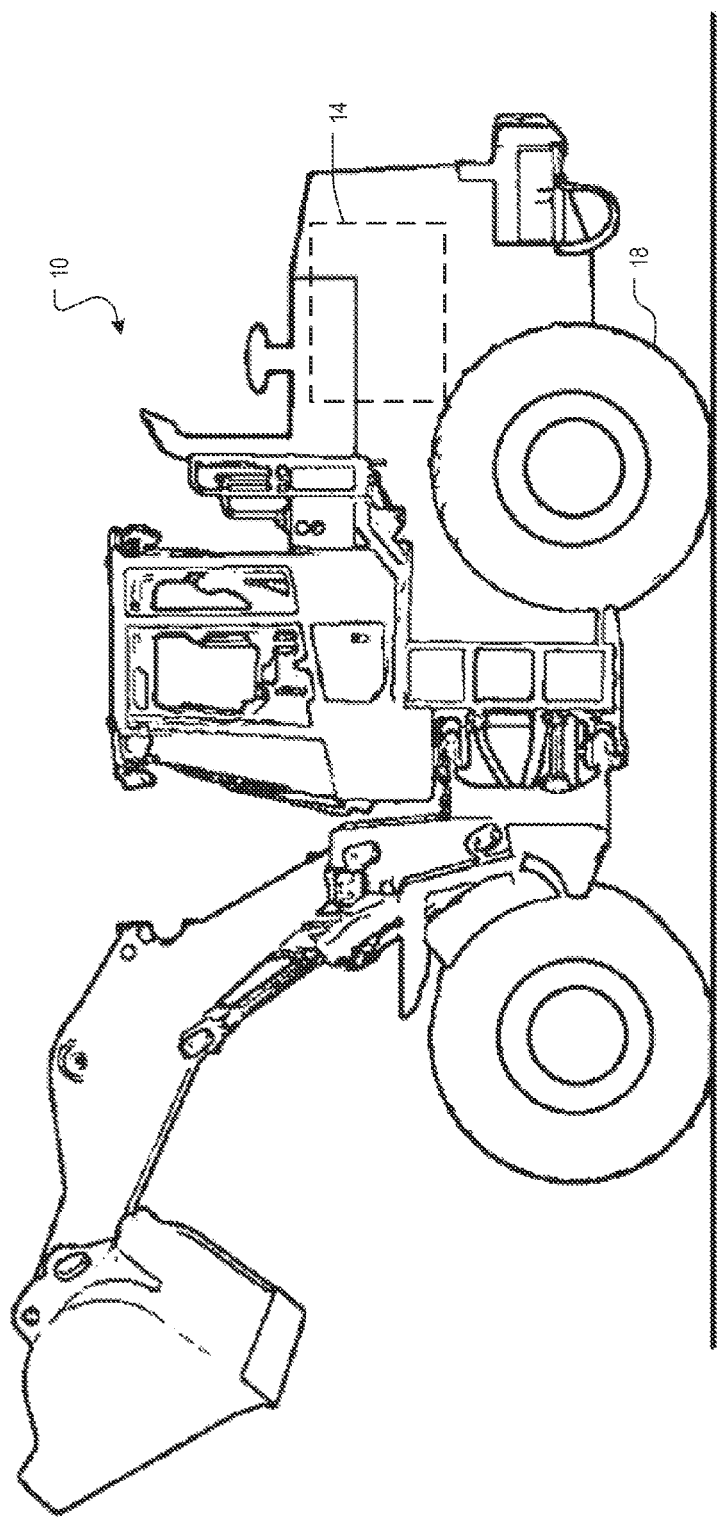
FIG. 1 is a side view of a vehicle in which the disclosed system and method for shifting may be implemented.

FIG. 1 illustrates an exemplary vehicle 10 including an engine 14 and a driven member 18 (e.g., wheels) powered by the engine 14. The illustrated vehicle 10 is a front-end loader, but the systems and techniques described herein are not so limited in application and can be used in conjunction with tractors, lawn mowers, utility vehicles, passenger vehicles, or any other vehicle or machine incorporating an automatic transmission.

Figure 2:
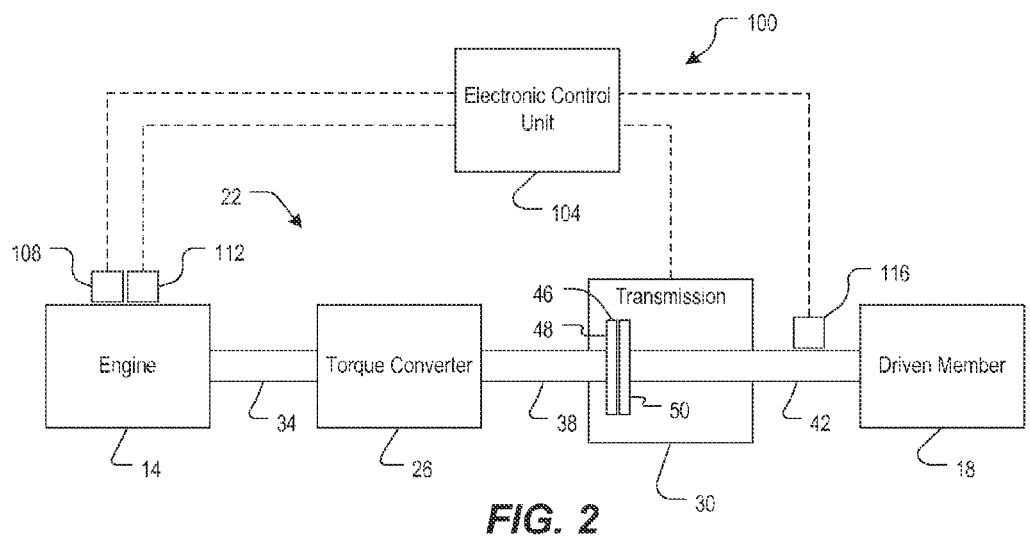
FIG. 2 is a schematic diagram of a drivetrain and a shifting control system according to one embodiment.

FIG. 2 illustrates a drivetrain 22 and a shifting control system 100, which includes an electronic control unit ("ECU") or controller 104, associated with the vehicle 10 of FIG. 1 or with any other suitable vehicle or machine. The illustrated drivetrain 22 includes a torque converter 26 and an automatic transmission 30. The torque converter 26 is disposed between an output shaft 34 of the engine 14 and an input shaft 38 of the transmission 30 and provides a fluid coupling to transmit power from the engine 14 to the transmission 30. For example, the torque converter 26 may include an impeller (not shown) driven by the engine output shaft 34 and a turbine (not shown) coupled to the transmission input shaft 38.

The transmission 30 includes a plurality of gears (not shown) and is shiftable to vary a gear ratio from the input shaft 38 to an output shaft 42 of the transmission 30, which is coupled to the driven member 18. In some embodiments, one or more reductions, differentials, or other drivetrain components may be incorporated between the output shaft 42 and the driven member 18. The illustrated transmission 30 includes a clutch assembly 46 that selectively transmits torque between the various transmission gears. The clutch assembly 46 has an upstream side 48 that receives torque from the input shaft 38, and a downstream side 50 that transmits torque to the output shaft 42. In other embodiments, any number of clutch assemblies may be used. The clutch assembly 46 may include a plurality of friction elements (e.g., discs, not shown) and a pressing element (not shown) that selectively presses the friction elements together to allow torque transmission across adjacent friction elements. In some embodiments, the clutch assembly 46 can be hydraulically actuated. In such embodiments, the pressing element includes a piston that presses the friction elements together in response to receiving pressurized fluid. Alternatively, the clutch assembly 46 can be electronically actuated. In such embodiments, the pressing element includes a solenoid or other actuator that presses the friction elements together in response to receiving a flow of electrical current. Operation of the clutch assembly 46 may be controlled by the ECU 104.

The ECU 104 is connected or communicatively coupled to a variety of modules or components, including a plurality of sensors 108, 112, 116 and the transmission 30. In some embodiments, the ECU 104 is configured, operable, or programmed to be an engine control unit for the engine 14. The ECU 104 may also be connected to other external systems, such as operator controls, a user interface, and the like. In the illustrated embodiment, the plurality of sensors 108, 112, 116 includes an engine speed sensor 108, an engine torque sensor 112, and an output speed sensor 116, which provide feedback to the ECU 104 indicative of the rotational speed of the engine output shaft 34, the torque produced by the engine 14 at the engine output shaft 34, and the rotational speed of the transmission output shaft 42, respectively. These parameters may be directly measured by the sensors 108, 112, 116, or they may be calculated from other parameters measured by these and/or other sensors. For example, the engine speed sensor 108 may monitor a rotational position of the engine output shaft 34, and the engine speed may be calculated as a rate of change of rotational position. As another example, the engine torque sensor 112 may monitor various engine performance parameters, such as engine air intake and fuel flow rates, which may then be used to calculate the torque produced by the engine 14. As yet another example, the transmission output speed sensor 116 may monitor a rotational speed of the driven member 18 or a ground speed of the vehicle 10, which may then be used to calculate the rotational speed of the transmission output shaft 42.

Figure 3:
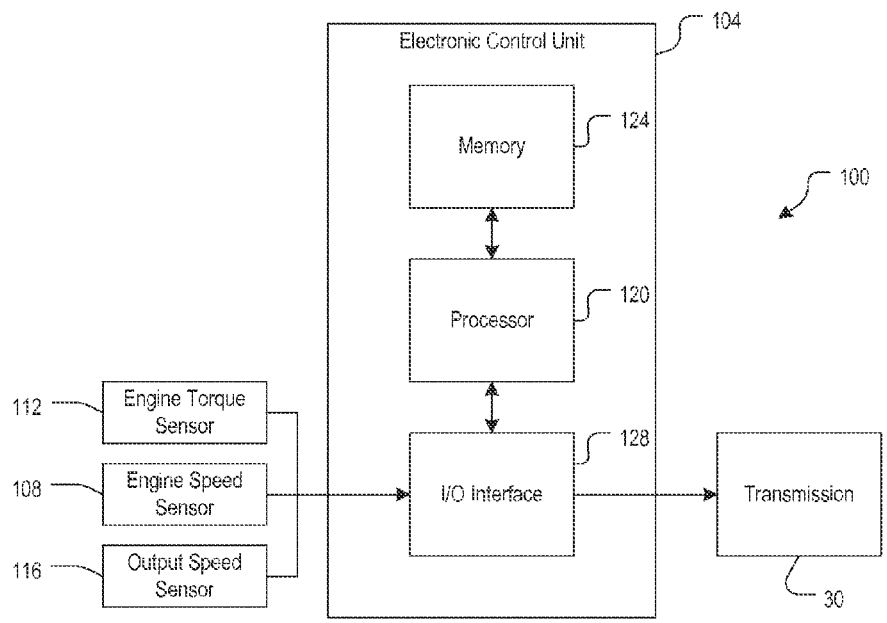
FIG. 3 is a block diagram of an electronic control unit of the shifting control system of FIG. 2.

Referring to FIG. 3, the ECU 104 includes combinations of hardware and software that are programmed, configured, and/or operable to, among other things, control the operation of the vehicle 10, engine 14, and/or transmission 30. In some embodiments, the ECU includes a plurality of electrical and electronic components that provide power, operational control, and protection to the components and modules within the ECU 104, the vehicle 10, the engine 14, and/or the transmission 30.

In the illustrated embodiment, the ECU 104 includes, among other things, an electronic processor 120 (e.g., a programmable microprocessor, microcontroller, or similar device), non-transitory, machine-readable memory 124, and an input/output interface 128. The electronic processor 120 is communicatively coupled to the memory 124 and to the input/output interface 128. In other embodiments, the ECU 104 includes additional, fewer, or different components. One or more control and/or data buses (not shown) may be provided for the interconnection between and communication amongst the various modules and components of the ECU 104. Software and instructions included in the implementation of the vehicle 10, engine 14, and/or transmission 30 can be stored in the memory 124 of the ECU 104. The software may include, for example, firmware, one or more applications, program data, filters, rules, one or more program modules, and other executable instructions. The ECU 104 is configured, operable, or programmed to retrieve from the memory 124 and execute, among other things, instructions related to the control processes and methods described herein.

In operation, the ECU 104 continuously or periodically receives sensed parameters in the form of signal inputs from each of the plurality of sensors 108, 112, 116. The input/output interface 128 coordinates input communications to the ECU 104 from the sensors 108, 112, 116 and also coordinates communications between the ECU 104 and the transmission 30. The ECU 104 uses the sensed parameters to determine a rotational speed of the transmission input shaft 38, also referred to herein as the transmission input speed. Using this information, in conjunction with a shifting algorithm 132 (FIG. 4), the ECU 104 may properly time and initiate a shift command through the input/output interface 128 to obtain a desired gear ratio between the transmission input shaft 38 and the transmission output shaft 42 and, therefore, between the engine 14 and the driven member 18.

Figure 4:
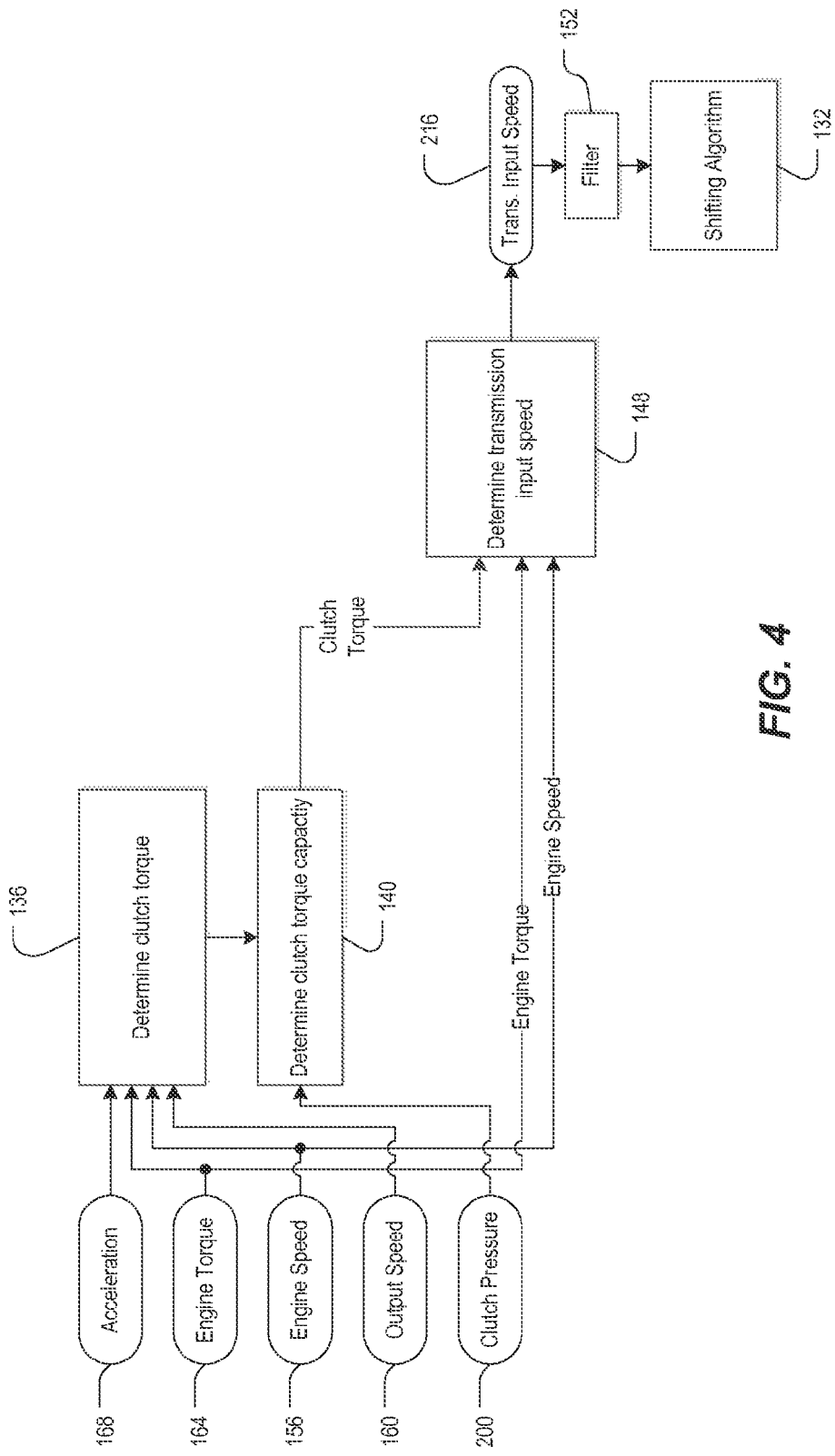
FIG. 4 is a flow diagram of operation of the shifting control system of FIG. 2.

FIG. 4 is an example of a control flow for the shifting control system 100 of FIG. 2. As described in greater detail below, the illustrated control flow advantageously allows the ECU 104 to determine the transmission input speed without requiring a hardware sensor between the transmission 30 and the torque converter 26 (FIG. 2). Values for various parameters described herein are calculated or determined estimations or estimated values for the parameter unless the parameter or value for the parameter is referred to as a sensed value or sensed parameter, or the parameter or value for the parameter is described as being received from a physical sensor (e.g., the sensors 108, 112, 116). Although the control flow is described and illustrated sequentially, the ECU 104 may complete or solve any of the steps and/or equations described herein simultaneously or in a variety of different sequences.

With continued reference to FIG. 4, the shifting control system 100 includes a determine clutch torque module 136, a determine clutch torque capacity module 140, a determine transmission input speed module 148, and an optional filter 152. Each of the modules in the illustrated embodiment is software which may be stored in the memory 124 of the ECU 104, for example. In other embodiments, the shifting control system 100 may not be divided into modules, or may include additional or fewer modules. The modules in the illustrated embodiment collectively use sensed parameters to determine the transmission input speed, which is then provided to the shifting algorithm 132.

Figure 5:
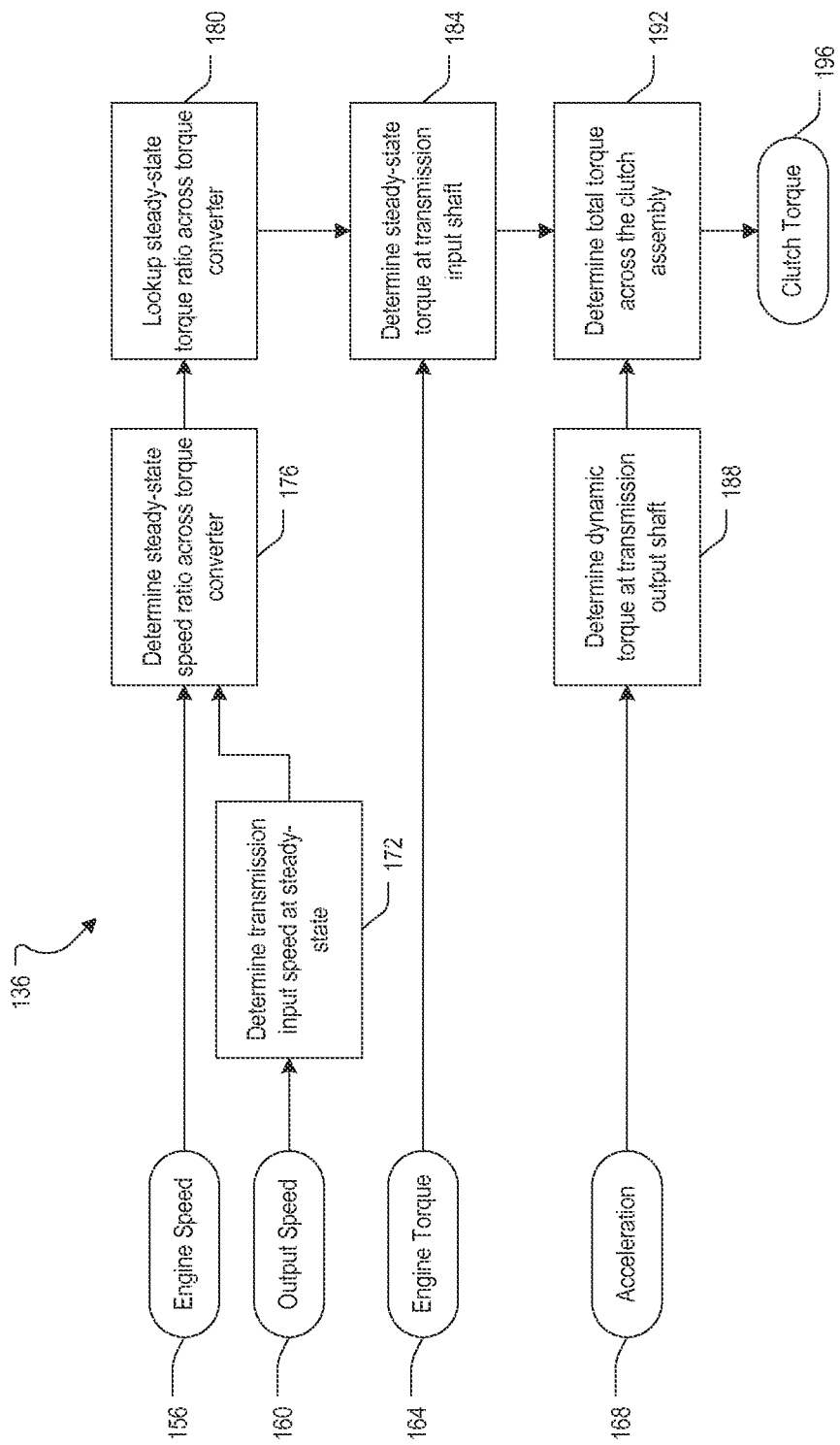
FIG. 5 is another flow diagram of operation of the shifting control system of FIG. 2.

FIG. 5 is an example of the determine clutch torque module 136. The module 136 receives a sensed engine speed parameter 156 (e.g., from the engine speed sensor 108), a sensed output speed parameter 160 (e.g., from the output speed sensor 116), and a sensed engine torque parameter 164 (e.g., from the engine torque sensor 112) (see also FIGS. 2 and 4). The module 136 also receives an acceleration parameter 168 corresponding with the angular acceleration of the transmission output shaft 42. The acceleration parameter 168 may be sensed directly (e.g., using an accelerometer) or may be derived from the sensed output speed parameter 160 or from other sensed parameters. As described below, the module 136 uses the parameters 156, 160, 164, 168 to determine steady-state and dynamic torque components, which are added to determine the total torque transmitted across the clutch assembly 46.

The transmission input speed at steady state may be determined at block 172, based on the output speed parameter 160. For example, the transmission input speed at steady-state may be determined by multiplying the output speed parameter 160 by a predetermined constant (e.g., the gear ratio across the transmission 30). Next, at block 176, the steady-state speed ratio across the torque converter 26 may be determined by dividing the steady-state transmission input speed by the engine speed parameter 156. With the steady-state speed ratio determined, the steady-state torque ratio across the torque converter 26 may be determined at block 180. In the illustrated embodiment, the steady-state torque ratio is determined using a lookup table, which may be stored in the memory 124. The lookup table is associated with the torque converter 26 and correlates a speed ratio across the torque converter 26 with a torque ratio across the torque converter 26, and vice versa. With the steady-state torque ratio known, the steady-state torque at the transmission input shaft 38 (i.e., on the upstream side 48 of the clutch assembly 46) may be determined by multiplying the steady-state torque ratio and the engine torque parameter 164.

With continued reference to FIG. 5, the steady-state torque at the transmission input shaft 38 is a first torque component, and the determine clutch torque module 136 is further operable to determine a second or dynamic torque component on the downstream side 50 of the clutch assembly 46 at block 188. The dynamic torque component may be determined, for example, by multiplying the inertia of the vehicle 10 by the acceleration parameter 168 and scaling the result by the gear ratio from the downstream side 50 of the clutch assembly 46 to the driven member 18. The inertia of the vehicle 10 may be based on a predetermined mass of the vehicle 10 and a sensed ground speed or the output speed parameter 160. With the steady-state torque component and the dynamic torque component known, the total torque across the clutch assembly 46 may be calculated at block 192 by adding the two components together. This value is output from the determine clutch torque module 136 as a clutch torque parameter 196.

Figure 6:
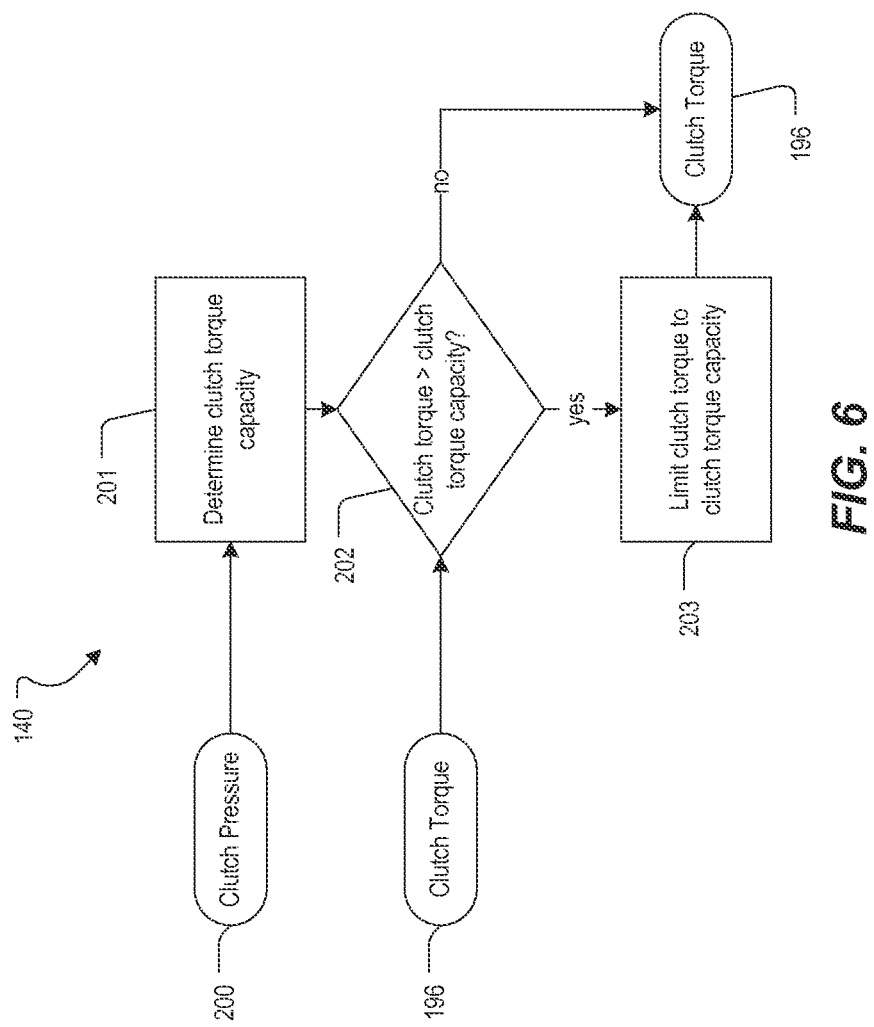
FIG. 6 is another flow diagram of operation of the shifting control system of FIG. 2.

FIG. 6 is an example of the determine clutch torque capacity module 140. In the illustrated embodiment, the module 140 receives a clutch pressure parameter 200 corresponding with the fluid pressure supplied to the pressing element of the clutch assembly 46. The clutch pressure parameter 200 may be a sensed parameter (e.g., from a pressure sensor), or the clutch pressure parameter 200 may be a commanded parameter, such as the target pressure to be supplied to the pressing element. The clutch torque capacity may be determined at block 201 based on the clutch pressure parameter 200 and is indicative of the maximum amount of torque that may be transmitted through the clutch assembly 46 without slippage. For example, the clutch torque capacity may be determined by multiplying the clutch pressure parameter 200 by a surface area of the pressing element, then multiplying the resulting force by a friction coefficient of the friction elements, the number of friction element interfaces, and a predetermined scaling constant. In embodiments where the clutch assembly 46 includes a solenoid or other electronic actuator, the clutch torque capacity may be determined based on a clutch current parameter.

With the clutch torque capacity determined, the clutch torque parameter 196 may then be compared with the clutch torque capacity at block 202. If the clutch torque parameter 196 exceeds the clutch torque capacity, the value of the clutch torque parameter 196 is limited to equal the clutch torque capacity at block 203. If the clutch torque parameter 196 is less than the clutch torque capacity, then the clutch torque parameter 196 is not adjusted. The clutch torque parameter 196 is then output by the determine clutch torque capacity module 140.

Figure 7:
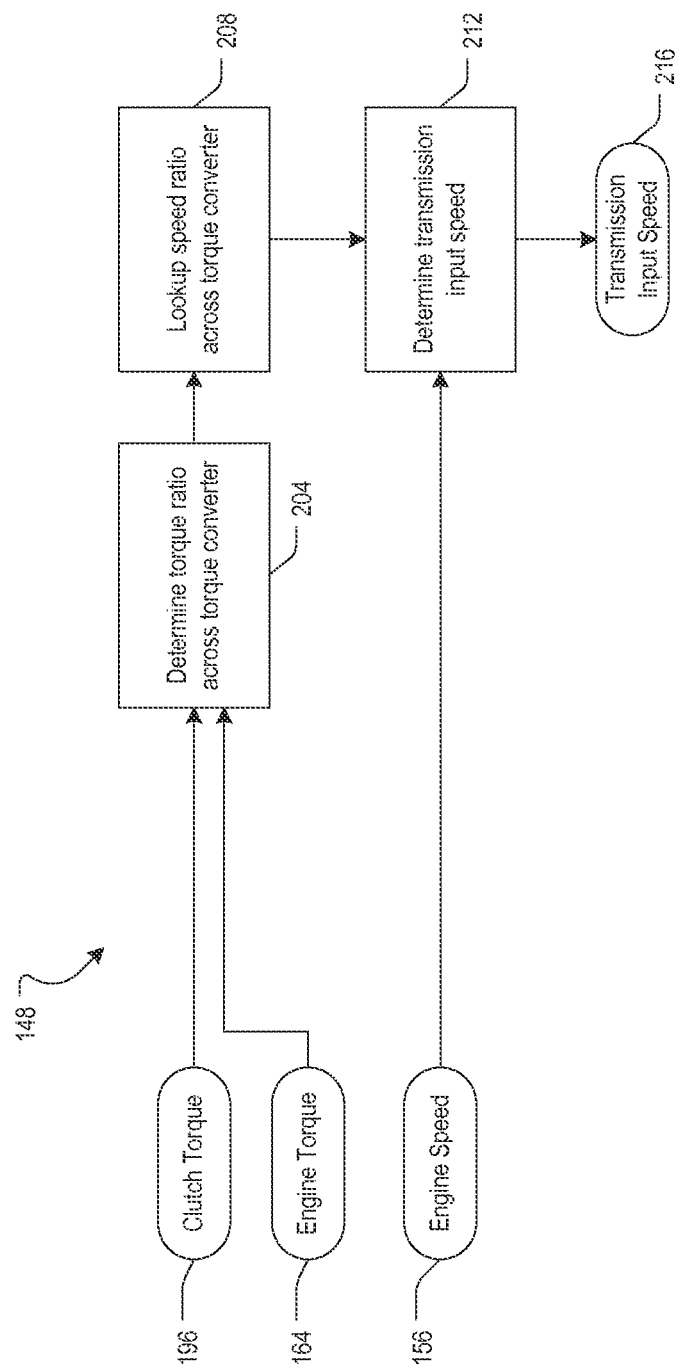
FIG. 7 is another flow diagram of operation of the shifting control system of FIG. 2.

FIG. 7 is an example of the determine transmission input speed module 148. In the illustrated embodiment, the module 148 receives the clutch torque parameter 196 from the determine clutch torque capacity module 140 (see also FIG. 4). The module 148 also receives the sensed engine torque parameter 164, and the sensed engine speed parameter 156. The torque ratio across the torque converter 26 may be determined at block 204 based on the clutch torque parameter 196 and the engine torque parameter 164. For example, torque ratio may be determined by dividing the clutch torque parameter 196 by the engine torque parameter 164.

With the torque ratio determined, the speed ratio across the torque converter 26 may be determined at block 208. In the illustrated embodiment, the speed ratio is determined using the lookup table associated with the torque converter 26. The transmission input speed may then be determined at block 212, based on the speed ratio and the engine speed parameter 156. For example, the transmission input speed may be determined by multiplying the speed ratio and the engine speed parameter 156. This value is output from the determine transmission input speed module 148 as a transmission input speed parameter 216.

Referring to FIG. 4, once the transmission input speed parameter 216 is determined, it may be filtered by a moving average filter 152 before being output to the shifting algorithm 132. This may help to smooth out any spikes or noise in the sensed parameters. In other embodiments, the filter may be another type of filter, or the filter may be omitted. Using the transmission input speed parameter 216, in conjunction with the shifting algorithm 132, the ECU 104 may make a shifting decision to properly time and initiate a shift command.

Various features of the disclosure are set forth in the following claims.

What is claimed is:

1. A system for controlling shifting for a drivetrain of a vehicle, the system comprising:
    an engine;
    a driven member;
    a transmission including an input shaft coupled to the engine and an output shaft coupled to the driven member, the transmission being shiftable to vary a gear ratio from the input shaft to the output shaft;
    a plurality of sensors for monitoring parameters of at least one of the engine, the driven member, or the transmission;
    a torque converter disposed between the engine and the input shaft; and
    an electronic control unit including a processor and a memory, the electronic control unit configured to
    receive sensed parameters from the plurality of sensors,
    determine a torque ratio across the torque converter based on the sensed parameters,
    determine a speed ratio associated with the torque ratio,
    determine a rotational speed of the input shaft based on the speed ratio and the sensed parameters, and
    command the transmission to shift to vary the gear ratio from the input shaft to the output shaft based on the rotational speed of the input shaft.

2. The system of claim 1, wherein the plurality of sensors includes a torque sensor for monitoring a torque output of the engine, a first speed sensor for monitoring a rotational speed output of the engine, and a second speed sensor for monitoring at least one of a ground speed of the vehicle or a rotational speed of the output shaft.

3. The system of claim 2, wherein the rotational speed of the input shaft is based on the speed ratio and the rotational speed output of the engine.

4. The system of claim 2, wherein the torque ratio is determined based on a steady-state torque calculation and a dynamic torque calculation.

5. The system of claim 4, wherein the dynamic torque calculation is based on an acceleration of the driven member or the output shaft.

6. The system of claim 1, wherein the transmission further includes at least one clutch.

7. The system of claim 6, wherein the electronic control unit is operable to determine a maximum torque capacity of the clutch.

8. The system of claim 7, wherein the torque ratio is determined based on the maximum torque capacity.

9. The system of claim 1, wherein the speed ratio is determined by referencing a look up table associated with the torque converter.

10. A method of controlling shifting for a drivetrain of a vehicle including an engine, a driven member, a shiftable transmission including an input shaft coupled to the engine and an output shaft coupled to the driven member, and a torque converter disposed between the engine and the input shaft, the method comprising:
    monitoring parameters of at least one of the engine, the driven member, or the transmission using a plurality of sensors;
    determining a torque ratio across the torque converter based on the monitored parameters;
    determining a speed ratio associated with the torque ratio;
    determining a rotational speed of the input shaft based on the speed ratio and the monitored parameters; and
    commanding the transmission to shift to vary a gear ratio from the input shaft to the output shaft based on the rotational speed of the input shaft.

11. The method of claim 10, wherein the plurality of sensors includes a torque sensor for monitoring a torque output of the engine, a first speed sensor for monitoring a rotational speed output of the engine, and a second speed sensor for monitoring at least one of a ground speed of the vehicle or a rotational speed of the output shaft.

12. The method of claim 11, wherein the rotational speed of the input shaft is determined based on the speed ratio and the rotational speed output of the engine.

13. The method of claim 10, wherein the transmission further includes at least one clutch having an upstream side configured to receive torque from the input shaft and a downstream side configured to transmit torque to the output shaft.

14. The method of claim 13, further comprising determining a maximum torque capacity of the clutch.

15. The method of claim 14, wherein determining the torque ratio includes determining a first torque component on the upstream side of the clutch, determining a second torque component on the downstream side of the clutch, determining a total torque across the clutch based on the first torque component and the second torque component, and limiting the total torque to the maximum torque capacity of the clutch.

16. The method of claim 15, wherein the first torque component includes a steady-state torque component and the second torque component includes a dynamic torque component.

17. The method of claim 16, wherein the dynamic torque component is based on an acceleration of at least one of the driven member or the output shaft.

18. The method of claim 14, wherein the maximum torque capacity is determined based on at least one of a pressure command and a current value sent to the clutch.

19. The method of claim 10, wherein the speed ratio is determined by referencing a look up table associated with the torque converter.

20. The method of claim 10, further comprising filtering the determined rotational speed of the input shaft using a moving average filter.

* * * * *